US008419542B2

(12) United States Patent
Saffari et al.

(10) Patent No.: US 8,419,542 B2
(45) Date of Patent: Apr. 16, 2013

(54) WIDE AREA BONUSING SYSTEMS

(75) Inventors: Ali Saffari, Reno, NV (US); Chris Reddicks, Reno, NV (US); Mark Bansemer, Reno, NV (US); Anisur Chowdhury, Reno, NV (US); Bryan Wolf, Reno, NV (US)

(73) Assignee: IGT, Reno, NV (US)

(*) Notice: Subject to any disclaimer, the term of this patent is extended or adjusted under 35 U.S.C. 154(b) by 1250 days.

(21) Appl. No.: 10/923,333

(22) Filed: Aug. 20, 2004

(65) Prior Publication Data

US 2006/0040743 A1 Feb. 23, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl.

USPC .................. 463/42; 463/20; 463/22; 463/25; 463/27; 273/274

(58) Field of Classification Search .................... 463/22, 463/42, 25, 20, 27; 273/274

See application file for complete search history.

(56) References Cited

U.S. PATENT DOCUMENTS

| | | | | |
|---|---|---|---|---|
| 4,468,750 | A | 8/1984 | Chamoff et al. | |
| 4,532,416 | A | 7/1985 | Berstein | |
| 4,837,728 | A | 6/1989 | Barrie et al. | |
| 4,856,787 | A | 8/1989 | Itkis | |
| 4,868,900 | A | 9/1989 | McGuire | |
| 5,103,079 | A | 4/1992 | Barakai et al. | |
| 5,116,055 | A | 5/1992 | Tracy | |
| 5,149,945 | A | 9/1992 | Johnson et al. | |
| 5,249,800 | A | 10/1993 | Hilgendorf et al. | |
| 5,275,400 | A | 1/1994 | Weingardt et al. | |
| 5,280,909 | A | 1/1994 | Tracy | |
| 5,286,023 | A | 2/1994 | Wood | |
| 5,344,144 | A | 9/1994 | Canon | |
| 5,380,008 | A * | 1/1995 | Mathis et al. | 463/18 |
| 5,401,024 | A * | 3/1995 | Simunek | 463/18 |
| 5,466,920 | A | 11/1995 | Nair et al. | |

(Continued)

FOREIGN PATENT DOCUMENTS

| | | |
|---|---|---|
| AU | 199650576 | 4/1997 |
| EP | 769769 | 4/1997 |

(Continued)

OTHER PUBLICATIONS

International Search Report dated Dec. 22, 2005 mailed Jan. 12, 2006, from corresponding International Application No. PCT/US2005/029465, 4 pp.

(Continued)

*Primary Examiner* — David L Lewis
*Assistant Examiner* — Adetokunbo Torimiro
(74) *Attorney, Agent, or Firm* — Foley & Lardner LLP

(57) ABSTRACT

The present invention provides a novel bonusing system implemented on gaming machines and associated network devices on a network. According to some implementations, a central system qualifies or eliminates sites and/or types of gaming devices for participation based on criteria such as contribution level, games available, date range, location, device manufacturer, denominations available, etc. In some implementations, the qualification or elimination process is performed at a site (e.g., by a site controller) according to criteria obtained from the central system. The methods of the present invention may be de-coupled from player tracking methods.

22 Claims, 7 Drawing Sheets

U.S. PATENT DOCUMENTS

| | | | | |
|---|---|---|---|---|
| 5,491,812 | A | 2/1996 | Pisello et al. | |
| 5,611,730 | A | 3/1997 | Weiss | |
| 5,643,086 | A | 7/1997 | Alcorn et al. | |
| 5,651,548 | A | 7/1997 | French et al. | |
| 5,655,961 | A * | 8/1997 | Acres et al. | 463/27 |
| 5,702,304 | A | 12/1997 | Acres et al. | |
| 5,735,742 | A | 4/1998 | French | |
| 5,761,647 | A | 6/1998 | Boushy | |
| 5,766,076 | A | 6/1998 | Pease et al. | |
| 5,781,647 | A | 7/1998 | Fishbine et al. | |
| 5,819,107 | A | 10/1998 | Lichtman et al. | |
| 5,820,459 | A | 10/1998 | Acres et al. | |
| 5,941,769 | A | 8/1999 | Order | |
| 6,003,013 | A | 12/1999 | Boushy et al. | |
| 6,033,307 | A * | 3/2000 | Vancura | 463/20 |
| 6,080,062 | A * | 6/2000 | Olson | 463/42 |
| 6,104,815 | A | 8/2000 | Alcorn et al. | |
| 6,106,396 | A | 8/2000 | Alcorn et al. | |
| 6,113,492 | A | 9/2000 | Walker et al. | |
| 6,135,884 | A | 10/2000 | Hedrick et al. | |
| 6,149,522 | A | 11/2000 | Alcorn et al. | |
| 6,183,362 | B1 | 2/2001 | Boushy | |
| 6,193,152 | B1 | 2/2001 | Fernando et al. | |
| 6,193,607 | B1 * | 2/2001 | Kay | 463/22 |
| 6,217,448 | B1 * | 4/2001 | Olsen | 463/25 |
| 6,241,608 | B1 | 6/2001 | Torango et al. | |
| 6,302,793 | B1 | 10/2001 | Fertitta, III et al. | |
| 6,306,035 | B1 | 10/2001 | Kelly et al. | |
| 6,313,871 | B1 | 11/2001 | Schubert | |
| 6,358,149 | B1 * | 3/2002 | Schneider et al. | 463/27 |
| 6,368,216 | B1 | 4/2002 | Hedrick et al. | |
| 6,371,852 | B1 | 4/2002 | Acres | |
| 6,409,595 | B1 | 6/2002 | Uihlein et al. | |
| 6,454,648 | B1 | 9/2002 | Kelly et al. | |
| 6,532,297 | B1 | 3/2003 | Lindquist | |
| 6,592,458 | B1 * | 7/2003 | Ho | 463/17 |
| 6,592,460 | B2 | 7/2003 | Torango et al. | |
| 6,607,439 | B2 | 8/2003 | Schneier et al. | |
| 6,645,077 | B2 | 11/2003 | Rowe | |
| 6,663,490 | B2 | 12/2003 | Soltys et al. | |
| 6,682,423 | B2 | 1/2004 | Brosnan et al. | |
| 6,684,195 | B1 | 1/2004 | Deaton et al. | |
| 6,776,715 | B2 | 8/2004 | Price | |
| 6,857,959 | B1 | 2/2005 | Nguyen | |
| 7,329,183 | B2 | 2/2008 | Michaelson et al. | |
| 2001/0038178 | A1 * | 11/2001 | Vancura | 273/274 |
| 2001/0053712 | A1 | 12/2001 | Yoseloff et al. | |
| 2002/0071557 | A1 | 6/2002 | Nguyen | |
| 2002/0077178 | A1 | 6/2002 | Oberberger et al. | |
| 2003/0022714 | A1 | 1/2003 | Oliver | |
| 2003/0060279 | A1 | 3/2003 | Torango et al. | |
| 2003/0092484 | A1 | 5/2003 | Schneider et al. | |
| 2003/0104860 | A1 | 6/2003 | Cannon et al. | |
| 2003/0148808 | A1 | 8/2003 | Price | |
| 2003/0162591 | A1 | 8/2003 | Nguyen et al. | |
| 2003/0181231 | A1 | 9/2003 | Vancura et al. | |
| 2003/0211883 | A1 | 11/2003 | Potts | |
| 2004/0002385 | A1 | 1/2004 | Nguyen | |
| 2004/0038735 | A1 | 2/2004 | Steil et al. | |
| 2004/0066278 | A1 | 4/2004 | Hughes et al. | |
| 2004/0142740 | A1 * | 7/2004 | Damico et al. | 463/20 |
| 2004/0152511 | A1 * | 8/2004 | Nicely et al. | 463/27 |
| 2004/0166923 | A1 * | 8/2004 | Michaelson et al. | 463/20 |
| 2005/0020354 | A1 | 1/2005 | Nguyen et al. | |
| 2005/0043086 | A1 | 2/2005 | Schneider | |
| 2006/0040736 | A1 * | 2/2006 | Baerlocher et al. | 463/27 |
| 2006/0040743 | A1 | 2/2006 | Saffari et al. | |
| 2006/0100008 | A1 * | 5/2006 | Wright et al. | 463/17 |
| 2006/0247035 | A1 | 11/2006 | Rowe et al. | |
| 2007/0060237 | A1 | 3/2007 | Rowe et al. | |
| 2007/0060311 | A1 | 3/2007 | Rowe et al. | |
| 2007/0106553 | A1 | 5/2007 | Jordan et al. | |

FOREIGN PATENT DOCUMENTS

| | | |
|---|---|---|
| EP | 1211630 | 6/2002 |
| EP | 1380998 A1 | 1/2004 |
| EP | 1528514 | 5/2005 |
| EP | 1554021 | 7/2005 |
| EP | 1938288 | 7/2008 |
| JP | 2003279648 | 10/2003 |
| WO | 96/06409 | 2/1996 |
| WO | 96/36253 | 11/1996 |
| WO | WO97/44750 | 11/1997 |
| WO | 00/16289 | 3/2000 |
| WO | 00/22585 | 4/2000 |
| WO | 02/077939 | 10/2002 |
| WO | WO2004/027584 | 4/2004 |
| WO | 2004/088604 | 10/2004 |
| WO | 2005/022443 | 10/2005 |
| WO | 2005/105235 | 11/2005 |
| WO | WO2006/023681 | 3/2006 |
| WO | 2006/037220 | 4/2006 |
| WO | 2007/032954 | 3/2007 |
| WO | WO2007/145999 | 12/2007 |

OTHER PUBLICATIONS

Written Opinion of the International Searching Authority mailed Jan. 12, 2006, from corresponding International Application No. PCT/US2005/029465, 6 pp.

U.S. Appl. No. 09/642,192, filed Aug. 18, 2000, Entitled: Gaming Machine Virtual Player Tracking and Related Services.

Written Opinion dated Dec. 13, 2007 issued in PCT/US2007/013325 (WO2007/145999).

International Search Report dated Dec. 13, 2007 issued in PCT/US2007/013325 (WO2007/145999).

International Search Report dated Nov. 1, 2004 issued in PCT/US2003/030170 (WO2004/027584).

Written Opinion dated May 23, 2005 issued in PCT/US2003/030170 (WO2004/027584).

European Supplemental Search Report dated May 15, 2007 issued in EP03754879.

US Office Action dated Jul. 2, 2004 issued in U.S. Appl. No. 10/670,153.

US Office Action dated Jan. 5, 2005 issued in U.S. Appl. No. 10/670,153.

US Office Action—Final dated May 26, 2005 issued in U.S. Appl. No. 10/670,153.

US Advisory Action dated Aug. 8, 2005 issued in U.S. Appl. No. 10/670,153.

US Office Action dated Oct. 26, 2005 issued in U.S. Appl. No. 10/670,153.

US Office Action—Interview Summary dated Jan. 24, 2006 issued in U.S. Appl. No. 10/670,153.

US Office Action—Final dated Aug. 1, 2006 issued in U.S. Appl. No. 10/670,153.

US Advisory Action dated Oct. 20, 2006 issued in U.S. Appl. No. 10/670,153.

US Office Action dated Jun. 1, 2007 issued in U.S. Appl. No. 10/670,153.

US Office Action—Final dated Feb. 14, 2008 issued in U.S. Appl. No. 10/670,153.

PCT Search Report and Written Opinion from Corresponding International Application No. PCT/US2006/034510, dated Apr. 6, 2007, 15 pages.

EPO Office Action mailed Jul. 8, 2008 in European Application No. 06790165.2, 6 pages.

Wang et al., "Casino Technology: Player Tracking and Slot Accounting Systems", Gaming Res. Rev. J. (USA), Gaming Research & Review Journal, Univ. Nevada (Abstract).

Office Action dated Jul. 1, 2002 for U.S. Appl. No. 09/642,192.

Final Office Action dated Jan. 2, 2003 for U.S. Appl. No. 09/642,192.

Office Action dated Apr. 21, 2003 for U.S. Appl. No. 09/642,192.

Final Office Action dated Sep. 30, 2003 for U.S. Appl. No. 09/642,192.

Office Action dated Feb. 10, 2004 for U.S. Appl. No. 09/642,192.

Office Action dated Jul. 1, 2004 for U.S. Appl. No. 09/642,192.

Final Office Action dated Mar. 28, 2006 for U.S. Appl. No. 09/642,192.

Office Action dated Nov. 20, 2006 for U.S. Appl. No. 09/642,192.

Office Action dated Jul. 18, 2007 for U.S. Appl. No. 11/225,299.

Final Office Action dated Jan. 8, 2008 for U.S. Appl. No. 11/225,299.
Office Action dated Jun. 11, 2008 for U.S. Appl. No. 11/225,299.
Final Office Action dated Dec. 9, 2008 for U.S. Appl. No. 11/225,299.
US Office Action dated Mar. 31, 2009 issued in U.S. Appl. No. 11/449,985.
European Office Action dated Feb. 10, 2009 issued in 01 962 051.7-1238.
US Final Office Action dated Dec. 9, 2008 issued in U.S. Appl. No. 11/225,299.
European Examination Report dated Jul. 8, 2008 issued in 06 790 165.2.
European Examination Report dated Mar. 2, 2009 issued in 06 790 165.2.
US Office Action dated Sep. 11, 2008 issued in U.S. Appl. No. 10/670,153.
US Final Office Action dated Apr. 6, 2009 issued in U.S. Appl. No. 10/670,153.
US Office Action dated Jun. 24, 2009 for U.S. Appl. No. 11/225,299.

* cited by examiner

WIDE AREA BONUSING SYSTEMS

FIELD OF THE INVENTION

The present invention relates to gaming machines, such as slot machines and video poker machines. More particularly, the present invention relates to methods and devices for awarding bonuses to gaming machines.

BACKGROUND OF THE INVENTION

Typically, utilizing a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

The present invention is primarily directed to methods and devices for implementing bonus prize winning modes, referred to herein as "bonusing systems." A bonusing system may award a bonus prize in addition to, and independently of, the prizes available due to a game outcome. A bonusing system normally includes a bank of gaming machines in a particular gaming establishment, such as an individual casino. Each gaming machine has an interface that provides communication between the gaming machine and a central network device, such as a server. The server receives information from each gaming machine regarding, e.g., an indication of play, a wager value, etc. The server determines a bonus prize pool that accumulates as the gaming machines are played. The accumulated bonus prize pool may be displayed on the participating gaming machines. The bonus prize pool continues to accumulate until there is a bonus prize award to a particular gaming machine.

Bonusing systems have proven to be popular with players of gaming machines and to increase levels of play, particularly when the bonus prize pool becomes large. However, bonusing systems are limited to a specific site, such as a casino or similar establishment. Therefore, the bonus pool can only grow as fast as contributions at that site will permit. Moreover, bonusing systems are typically implemented as part of a player tracking or accounting system. Therefore, adding bonusing features to a set of gaming machines requires that the player tracking or accounting system be upgraded. In addition, owners of gaming establishments do not want to share player tracking information, so linking bonusing systems between gaming establishments would be problematic. It would be desirable to provide novel bonusing systems that address these and other limitations of the prior art.

SUMMARY OF THE INVENTION

The present invention provides a novel bonusing system implemented on gaming machines and associated network devices on a network. According to some implementations, a central system qualifies or eliminates sites and/or types of gaming devices for participation based on criteria such as contribution level, games available, date range, location, device manufacturer, denominations available, etc. In some implementations, the qualification or elimination process is performed, at least in part, at a site (e.g., by a site controller) according to criteria obtained from the central system. The methods of the present invention may be de-coupled from player tracking methods. Some aspects of the present invention are implemented, in part, using wide area progressive systems developed by the present assignee.

Some implementations of the invention provide a method for providing wide area bonusing on a gaming network. The method includes the following steps: initiating a bonus accumulation period; increasing a bonus amount from an initial bonus amount during the bonus accumulation period according to bonus accumulation criteria; identifying a first bonus-triggering criterion separate from gaming criteria for winning a game played on a gaming machine; determining whether one of a plurality of gaming machines located in a plurality of gaming establishments and interconnected on a wide area bonusing network indicates the first bonus-triggering criterion; and paying out at least a portion of the bonus amount to a gaming machine when the gaming machine indicates the first bonus-triggering criterion.

The method may be performed without reference to a player tracking system. The bonus accumulation criteria may include a percentage of a wager on a gaming machine.

The method may also include the step of qualifying a gaming establishment, a portion of a gaming establishment and/or a gaming machine for participation in bonusing. The step of qualifying a gaming machine for participation in bonusing may be determined according to, for example, contribution level, games available, date range, location, device manufacturer and denominations available. The method may also include the step of providing protocol mediation for different types of gaming machines.

At least one step of the method may be synchronized with an award of a progressive jackpot. The method may include the step of receiving a request for participation in bonusing.

The identifying step, which may be performed by a central system or a site controller of a gaming establishment, may involve identifying a randomly generated number generated by a central system or provided to a central system. The identifying step may also involve identifying a second bonus-triggering criterion, wherein the determining step further comprises determining whether one of the plurality of gaming machines indicates the second bonus-triggering criterion; and wherein the paying step further comprises paying out at least a portion of the bonus amount to the gaming machine when the gaming machine further indicates the second bonus-triggering criterion.

The determining step may also be performed by a central system or a site controller of a gaming establishment. The determining step may involve comparing a first random number generated by a gaming machine with a second random number.

In some implementations of the method, a first entity controls first gaming machines and a second entity controls second gaming machines of the plurality of gaming machines. Alternatively, a first entity may control a first gaming establishment and a second entity may control a second gaming establishment of the plurality of gaming establishments.

Alternative implementations of the invention involve a method for providing bonusing and progressive jackpots on a gaming network. The method includes these steps: providing a first chance for a each of a first plurality of gaming devices to win a progressive jackpot via the gaming network, wherein an award of the progressive jackpot is based in part on gaming criteria for winning a game played on the first plurality of gaming machines; and providing a second chance for a each of a second plurality of gaming machines to win a bonus via the gaming network, wherein a bonus award is based on a bonus-triggering criterion that is separate from the gaming criteria.

The first plurality and the second plurality may or may not be coextensive. In some such implementations, the second plurality includes first gaming machines located in a first gaming establishment and second gaming machines located in a second gaming establishment.

Other embodiments of the invention provide a network device for implementing a wide area bonusing system. The network device includes an interface for communicating with a plurality of site controllers via a network, each site controller configured for communication with gaming machines. The network device also includes at least one logic device configured to do the following: initiate a bonus accumulation period; increase a bonus amount from an initial bonus amount during the bonus accumulation period according to bonus accumulation criteria; identify a bonus-triggering criterion separate from gaming criteria for winning a game played on a gaming machine; determine whether one of a first plurality of gaming machines indicates the bonus-triggering criterion; pay out at least a portion of the bonus amount to a first gaming machine of the first plurality of gaming machines when the first gaming machine indicates the bonus-triggering criterion; initiate a progressive jackpot accumulation period; increase a progressive jackpot from an initial jackpot amount during the progressive jackpot accumulation period according to progressive jackpot accumulation criteria; identify a progressive jackpot triggering criterion based at least in part on gaming criteria for winning a game played on a gaming machine; determine whether one of a second plurality of gaming machines indicates the progressive jackpot triggering criterion; and pay out at least a portion of the progressive jackpot to a second gaming machine of the second plurality of gaming machines when the second gaming machine indicates the progressive jackpot triggering criterion.

The first plurality and the second plurality may or may not be coextensive. The second plurality may include a first group of gaming machines located in a first gaming establishment and a second group of gaming machines located in a second gaming establishment. At least one logic device may be further configured to qualify gaming machines and/or gaming establishments for participation in bonusing.

Alternative implementations of the invention provide a network device for providing bonusing and progressive jackpots. The network device includes an interface for communicating with a plurality of site controllers located in a first plurality of gaming establishments. The network device also includes at least one logic device configured to do the following: initiate a bonus accumulation period; increase a bonus amount from an initial bonus amount during the bonus accumulation period according to bonus accumulation criteria; identify a bonus-triggering criterion separate from gaming criteria for winning a game played on a gaming machine; determine whether one of a plurality of gaming machines located in a second plurality of gaming establishments indicates the bonus-triggering criterion; and pay out at least a portion of the bonus amount to a gaming machine when the gaming machine indicates the bonus-triggering criterion.

At least one logic device may be further configured to qualify gaming machines and/or gaming establishments for participation in bonusing.

Yet other embodiments of the invention provide a network device for implementing a wide area bonusing system. The network device includes a first interface for communicating with a central gaming system via a network and at least one interface for communicating with a plurality of gaming machines. The network device also includes at least one logic device configured to do the following: poll the plurality of gaming machines; obtain data from each gaming machine of the plurality of gaming machines regarding participation in a wide area bonus round involving multiple gaming establishments; and forward the data to a central system that is implementing the wide area bonus round.

These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides a wide area bonusing system implemented on gaming machines and associated network devices on a network. In some implementations, individual sites may elect to participate in the wide area bonusing system and contribute to a wide area bonus pool. According to some implementations, sites and/or types of gaming devices are qualified for, or eliminated from, participation based on various criteria. These criteria may include, but are not limited to, contribution level, games available, date range, location, device manufacturer and denominations available. In some implementations, the qualification or elimination process is performed at a site (e.g., by a site controller) according to criteria obtained from a central system. In alternative implementations, the qualification or elimination process is performed by the central system.

Some implementations of the present invention use a modified version of preexisting progressive jackpot gaming networks to implement bonusing systems of the present invention. The bonusing and progressive jackpot features may apply to the same gaming machines or to different gaming machines on the same gaming network. For example, within a group of gaming machines in a particular gaming establishment, some may participate in a progressive jackpot, some may participate in bonusing and some may participate in both. The bonusing and progressive jackpot features may be implemented in a single gaming establishment or in multiple gaming establishments.

Figure 1:
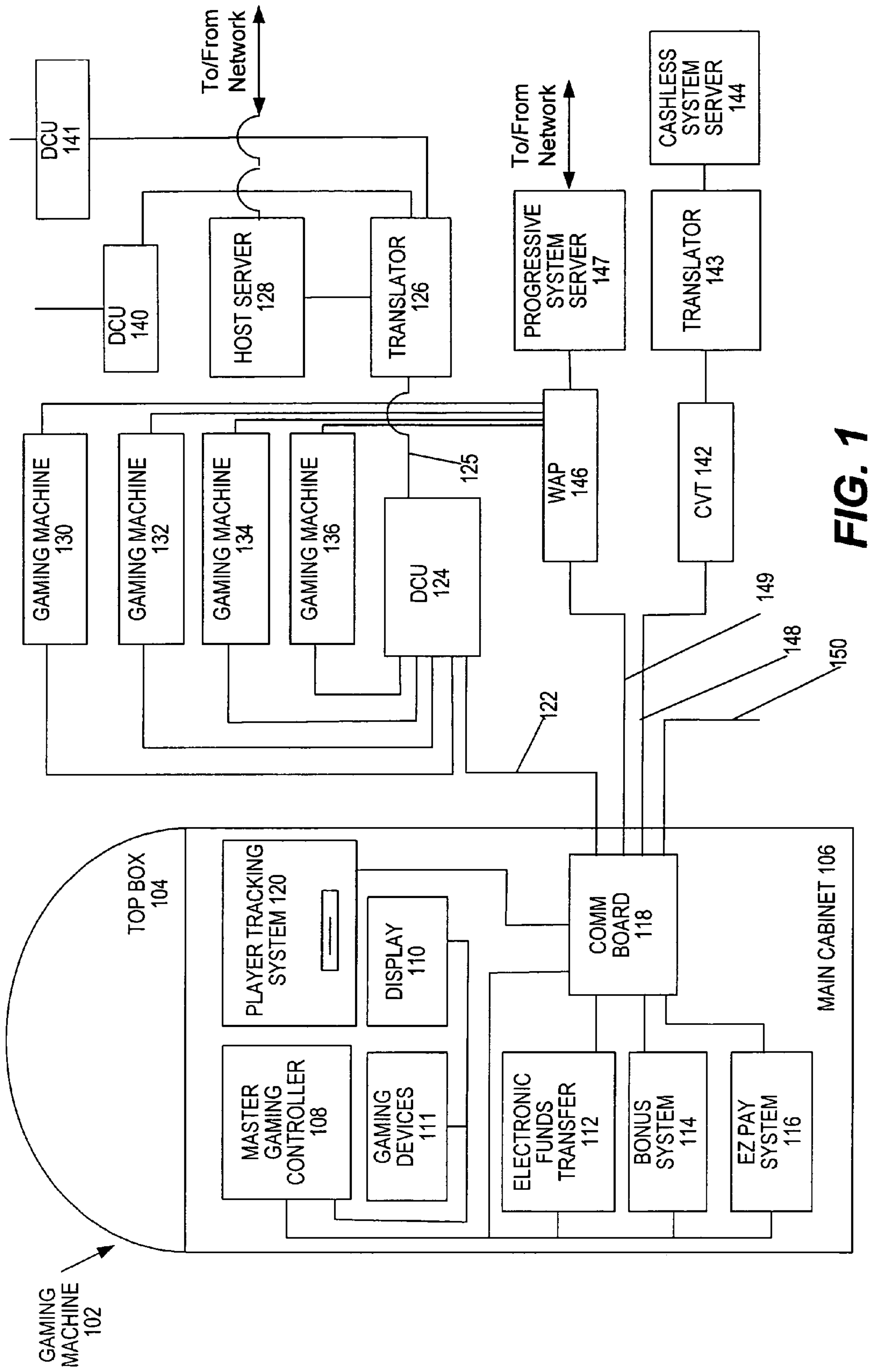
FIG. 1 is a block diagram depicting a network of gaming machines and other devices within a gaming establishment.

FIG. 1 is a simplified block diagram depicting gaming machines within gaming establishment 101. The gaming machines are connected with a dedicated communication network via a host server and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 1, gaming machine 102, and the other gaming machines 130, 132, 134, and 136, include a main cabinet 106 and a top box 104. The main cabinet 106 houses the main gaming elements and can also house peripheral systems, such as those that utilize dedicated gaming networks. The top box 104 may also be used to house these peripheral systems.

The master gaming controller 108 controls the game play on the gaming machine 102 and receives or sends data to various input/output devices 111 on the gaming machine 102. The master gaming controller 108 may also communicate with a display 110.

A particular gaming entity may desire to provide network gaming services that provide some operational advantage. Thus, dedicated networks may connect gaming machines to host servers that track the performance of gaming machines under the control of the entity, such as for accounting management, electronic find transfers (EFTs), cashless ticketing, such as EZPay™, marketing management, and data tracking, such as player tracking. Therefore, master gaming controller 108 may also communicate with EFT system 112, bonus system 114, EZPay™ system 116 (a proprietary cashless ticketing system of the present assignee), and player tracking system 120. The systems of the gaming machine 102 communicate the data onto the network 122 via a communication board 118.

However, the methods of the present invention may or may not be implemented in connection with a player tracking system. Some preferred bonusing systems of the present invention are de-coupled from player tracking systems. Such systems provide numerous benefits as compared to prior art systems. By eliminating the connection with player tracking systems, the wide area bonusing systems of the present invention do not require the information gathered by, e.g., the player tracking system of one casino to be shared by another casino in order for players at different casinos to be part of the same bonusing system. Therefore, the wide area bonusing systems of the present invention encourage the formation of larger groups of players participating in a bonus system.

In general, the dedicated communication network is not accessible to the public. Due to the sensitive nature of much of the information on the dedicated networks, for example, electronic find transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, gaming machines are made by many different manufacturers. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141.

Further, in some dedicated gaming networks, the DCU 124 can receive data transmitted from the host server 128 for communication to the gaming machines on the gaming network. The received data may be communicated synchronously to the gaming machines on the gaming network. Within a gaming establishment, the gaming machines 102, 130, 132, 134 and 136 are located on the gaming floor for player access while the host server 128 is usually located in another part of gaming establishment 101 (e.g. the backroom), or at another location.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machines 130, 132, 134 and 136 may also be connected to the clerk validation terminal 142 and may also receive cashless system services.

Via communication path 149, the gaming machine 102 is connected to a wide area progressive (WAP) device 146. The WAP is connected to a progressive system server 147 that may be used to provide progressive gaming services to the gaming machines. The progressive game services enabled by the progressive game network increase the game playing capabilities of a particular gaming machine by enabling a larger jackpot than would be possible if the gaming machine was operating in a "stand alone" mode. Playing a game on a participating gaming machine gives a player a chance to win the progressive jackpot. The potential size of the jackpot increases as the number of gaming machines connected in the progressive network is increased. The size of the jackpot tends to increase game play on gaming machines offering a progressive jackpot.

Gaming machines 130, 132, 134 and 136 are connected to WAP device 146 and progressive system server 147. Other gaming machines may also be connected to WAP device 146 and/or progressive system server 147, as will be described below with reference to FIG. 2A. Via communication path 150, the gaming machine 102 may be connected with additional gaming devices (not shown) that provide other gaming services.

In some embodiments of the present invention, gaming machines and other devices in the gaming establishment depicted in FIG. 1 are connected to a central system and/or other gaming establishments via one or more networks, which may be public or private networks. For example, host server 128 and/or progressive system server 147 may be connected to an outside network. In other embodiments, a bingo server, a switch, or another type of network device may be part of an interface with an outside network. A network device that links a gaming establishment with another gaming establishment and/or a central system will sometimes be referred to herein as a "site controller."

Figure 2A:
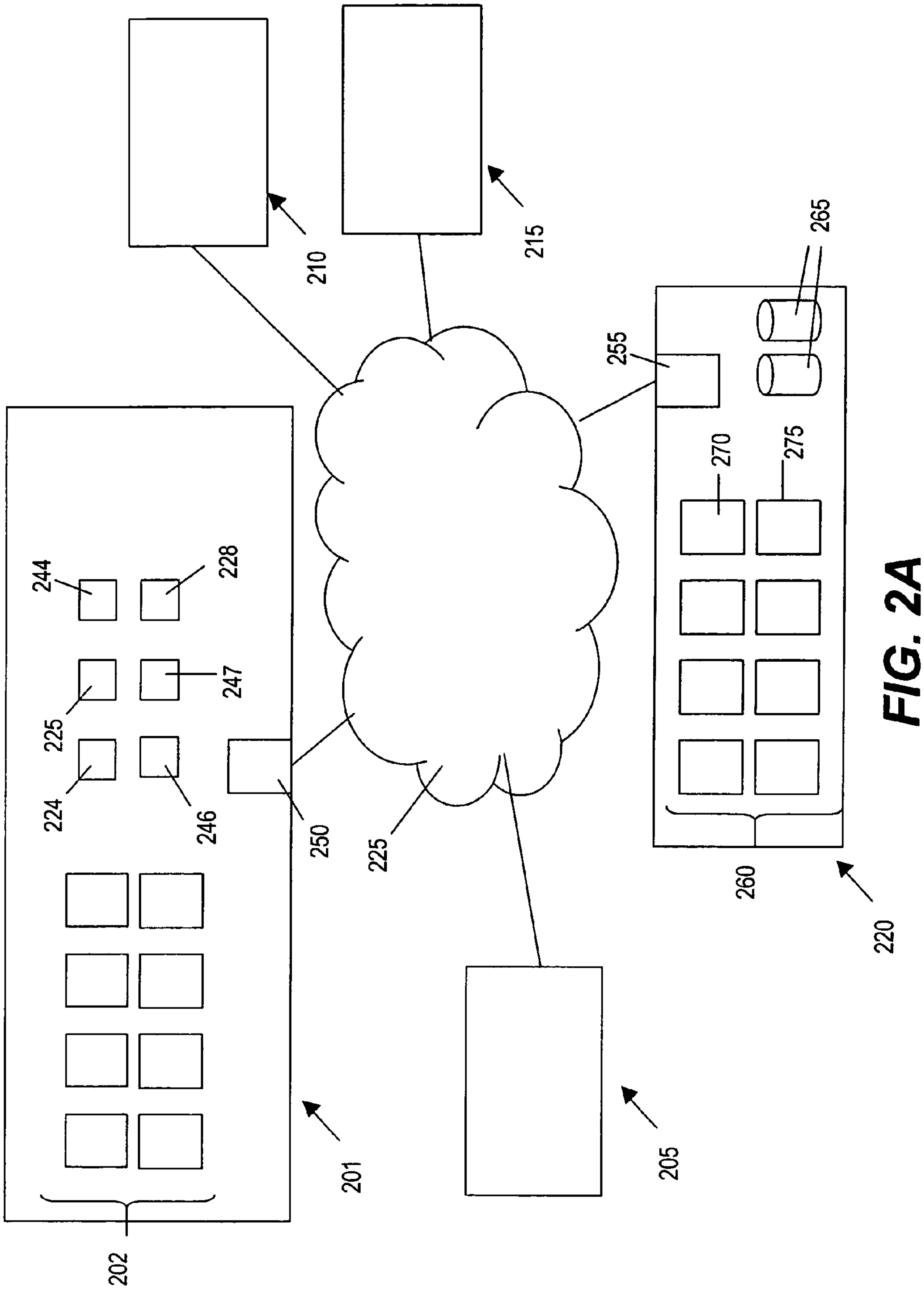
FIG. 2A is a network diagram depicting several gaming establishments configured for communication with a central system via a network that may be used to implement various embodiments of the present invention.

FIG. 2A is a simplified network diagram that illustrates a plurality of gaming establishments connected to a central system. In this example, gaming establishments 201, 205, 210 and 215 are connected to central system 220 via network 225. However, those of skill in the art will realize that more or fewer gaming establishments may be in communication with central system 220. Moreover, although central system 220 is depicted as having a single location, in alternate embodiments of the invention the devices that constitute central system 220 are in two or more locations.

In this example, network 225 is the Internet. However, it will be understood by those of skill in the art that network 225 could be any one of various other types of networks, such as the PSTN, a satellite network, a wireless network, a metro optical transport, etc. Accordingly, a variety of protocols may be used for communication on network 225, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

To transfer data in a secure manner, data transmitted over network 225 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. patent application Ser. No. 09/732,650, filed Dec. 7, 2000 by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, a site controller and central system 220 may have exchanged public encryption keys or public signature keys and other security information that may be used to establish the identity of the sender of a message to central system 220 and to identify messages sent from central system 220. Details of exchanging encryption keys in a secure manner which may be applied to the present invention are described in co-pending U.S. application Ser. No. 09/993,163, by Rowe et al., filed Nov. 16, 2001 and entitled "A Cashless Transaction Clearinghouse," which are incorporated herein by reference in its entirety and for all purposes.

Gaming establishment 201 is a casino in this example. Gaming establishments 205, 210 and 215 could be any type of gaming establishments that are configured to participate in bonusing and/or progressive jackpots, such as casinos, Internet casinos, etc. Gaming establishments 205, 210 and 215 may have the same owner or different owners.

Gaming establishment 201 includes many of the features of gaming establishment 101, including gaming machines 202, DCU 224, translator 225, host server 228, cashless system server 244, WAP device 246 and progressive system server 247. Depending on the embodiment, there may be a single DCU 224 or multiple DCUs. Similarly, there may be one or more translators 225, according to the details of the implementation.

Gaming establishment 201 may include one or more devices that are dedicated to wide area bonusing services. In alternative implementations, wide area bonusing services may be provided by devices that also provide other services, e.g., by WAP device 246 and progressive system server 247. According to such implementations, the network architecture of individual gaming establishments does not need to change in order to provide wide area bonusing services. A modified version of the WAP protocol may be used to implement some such wide area bonusing methods described herein. For example, in some such implementations progressive system server 247 encapsulates and decapsulates an additional header, pertaining to wide area bonusing, on WAP packets. However, the methods of the present invention may be performed by other network devices using other physical or logical networks.

In the embodiment shown in FIG. 2A, each gaming establishment includes a network device that acts as a site controller for interacting with central system 220 to provide bonusing services. The site controller may also be configured to provide other services, such as progressive jackpot services. In one such implementation, e.g., progressive system server 247 is configured to act as a site controller for providing both bonusing services and progressive jackpot services. As will be discussed in more detail below, many of the functions involved in providing these services can be provided by either the site controller or the central system.

Gateway 250 is a network device with network address translation ("NAT") and firewall capabilities that can support multiple devices of gaming establishment 201 with a single external IP address. Gateway 255 provides NAT and firewall capabilities for central system 220. Internet service providers ("ISPs," which are not shown in FIG. 2A) provide access to network 225 for gaming establishments 201, 205, 210 and 215, and central system 220.

In this example, central system 220 also includes multiple network devices 260 and storage devices 265. The number of network and storage devices shown is purely exemplary. Here, central bonusing server 270 controls a bonusing system for all participating gaming devices and gaming establishments. Similarly, central progressive server 275 controls a progressive jackpot system for all participating gaming devices and gaming establishments. In some implementations, the same network device is used to provide both progressive jackpot and bonusing services. The provision of such services will be described in more detail below.

Central system 220 may provide additional services, including but not limited to cashless services, loyalty program services, auditing services, entertainment content services, communication services, gaming software services, prize services, etc. In some implementations, individual network devices may provide some or all of such services, whereas in other embodiments separate network devices, storage devices, etc., may be dedicated to providing such services.

Cashless services may include services and information related to, e.g., electronic fund transfers. Loyalty program services may include services and information related to the accumulation of player tracking points and the validation of player tracking points for services and prizes. Auditing/accounting services may include services and information relating to player identity, tracking the performance of different gaming activities, etc. However, in some implementations of the present invention, bonusing services and/or progressive jackpot services are de-coupled from player tracking. This feature is advantageous because gaming establishments regard player tracking information as confidential and proprietary. Providing, e.g., bonusing services separately from player tracking services removes impediments to implementing bonusing services to multiple gaming establishments. Therefore, some methods of the present invention facilitate the accumulation of larger bonuses.

Entertainment content services may include information and services related to streaming video feeds and audio feeds to a client device of, for example, sporting events. Communications services may include information and services related to peer-to-peer communications between various devices in central system 220 and outside of central system 220, such as text messaging, voice communications, video feeds, e-mail, paging and locator services.

Gaming software services may include devices configured for downloading software to gaming devices. For instance, a game server may provide gaming software and gaming licenses used to play different games of chance on gaming devices. Further, the game server may be used to provide software upgrades and "bug" fixes for the gaming software. U.S. Pat. No. 6,645,077, which is hereby incorporated by reference, provides examples of such software services.

The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. application Ser. No. 09/515,717, filed on Feb. 29, 200, by Nguyen, and entitled "Name Your Prize Game Playing Methodology," which is incorporated herein in its entirety and for all purposes.

Some implementations of the present invention provide an interplay between progressive jackpot services and bonusing services. As noted above, for example, bonusing may advantageously be provided on one or more existing WAP systems. Moreover, the possibility of receiving a bonus may encourage continued play on gaming machines even after a progressive jackpot has been paid out. This allows the progressive jackpot amount to be renewed more quickly than when there is no chance of receiving a bonus.

Figure 2B:
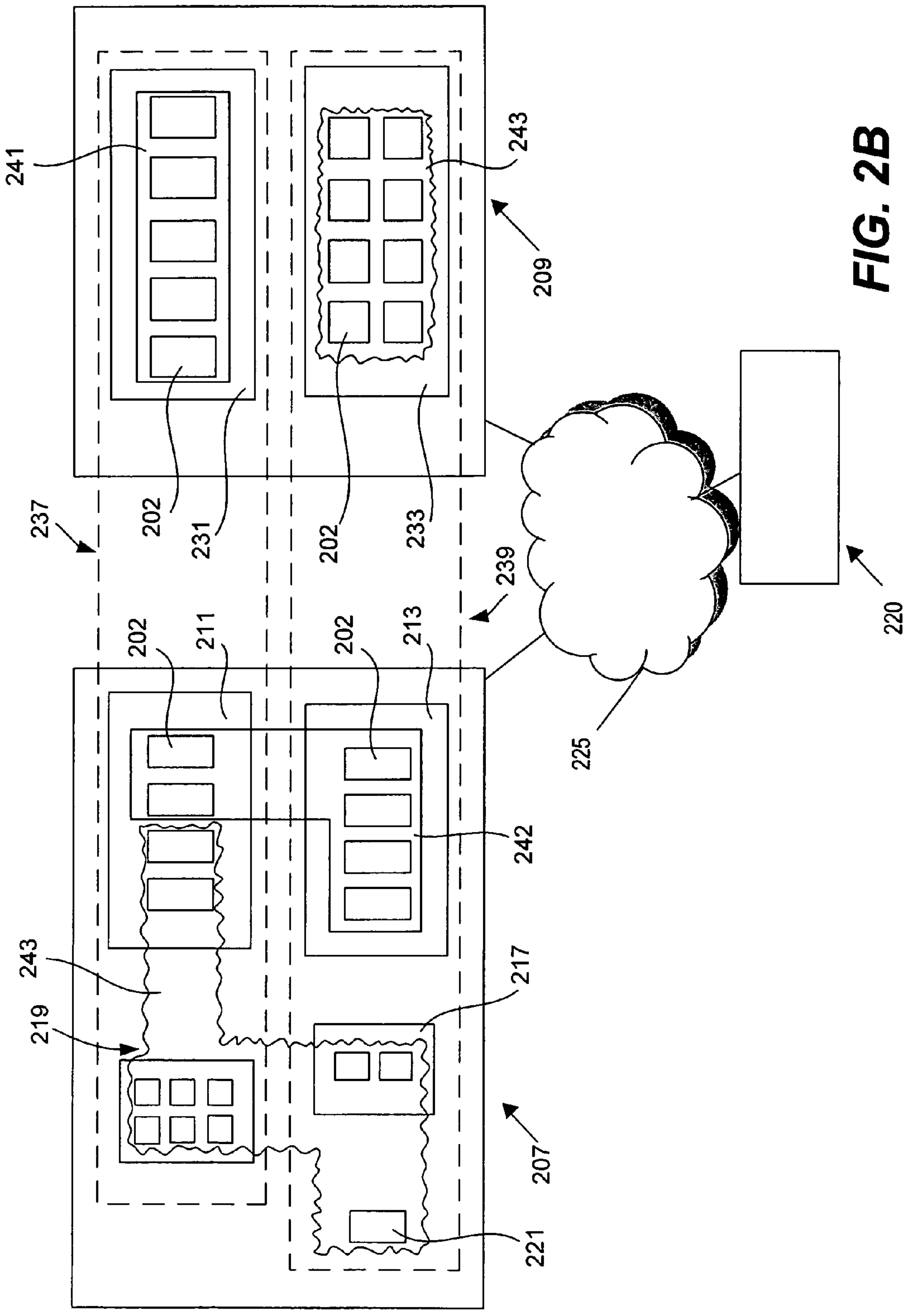
FIG. 2B is a network diagram depicting several gaming establishments configured for communication with a central system via a network that may be used to implement various types of wide area bonusing according to the present invention.

FIG. 2B is a network diagram that illustrates an exemplary relationship between bonusing and progressive jackpot services. Block 207 encompasses gaming machines operated by Entity A and block 209 encompasses gaming machines operated by Entity B. In this example, Entity A operates gaming machines 202 in casinos 211 and 213, as well as gaming machines in grocery 217, airport 219 and convenience store 221. Entity B operates gaming machines 202 in casinos 231 and 233.

In this example, WAP 237 and WAP 239 include gaming machines operated by both Entity A and Entity B. WAP 237 includes gaming machines in airport 219 and casinos 211 and 231. WAP 237 includes gaming machines in convenience store 221, grocery 217 and casinos 213 and 233. WAP 237 and WAP 239 are controlled by central system 220 via network 225 and various other devices, as described elsewhere herein.

The bonusing systems shown in FIG. 2B are implemented by WAP 237 and/or WAP 239. Such implementations are advantageous because they can exploit currently deployed network architecture, and therefore avoid the need to construct a separate bonusing network. However, alternative implementations of the invention are implemented on separate networks.

The bonusing systems illustrated in FIG. 2A do not include all of the gaming machines within the WAP systems on which they are implemented, i.e., the bonusing systems are not coextensive with the WAP systems. Bonusing system 241 is implemented by a single entity at a single site: bonusing system 241 includes only those gaming machines 202 within casino 231, all of which are operated by Entity B. Therefore, there are many other gaming machines within WAP 237 that are not included in bonusing system 241.

Bonusing system 242 is implemented by a single entity at multiple sites. Bonusing system 242 includes all gaming machines 202 within casino 213 and some gaming machines 202 within casino 211, all of which are operated by Entity A. In this example, bonusing system 242 is implemented on more than one WAP system.

Bonusing system 243 is implemented by multiple entities at multiple sites. Bonusing system 243 includes all gaming machines 202 within casino 233, which are operated by Entity B. Bonusing system 243 also includes all gaming machines of grocery 217, airport 219 and convenience store 221 and some gaming machines 202 within casino 211, all of which are operated by Entity A. Like bonusing system 242, bonusing system 243 is implemented on more than one WAP system.

In alternative implementations of the invention, bonusing systems and WAP systems are coextensive, i.e., they include the same gaming machines. Some implementations involve more than two WAP systems and some involve a single WAP system. Similarly, alternative implementations of the invention may include more or fewer bonusing systems.

Figure 3A:
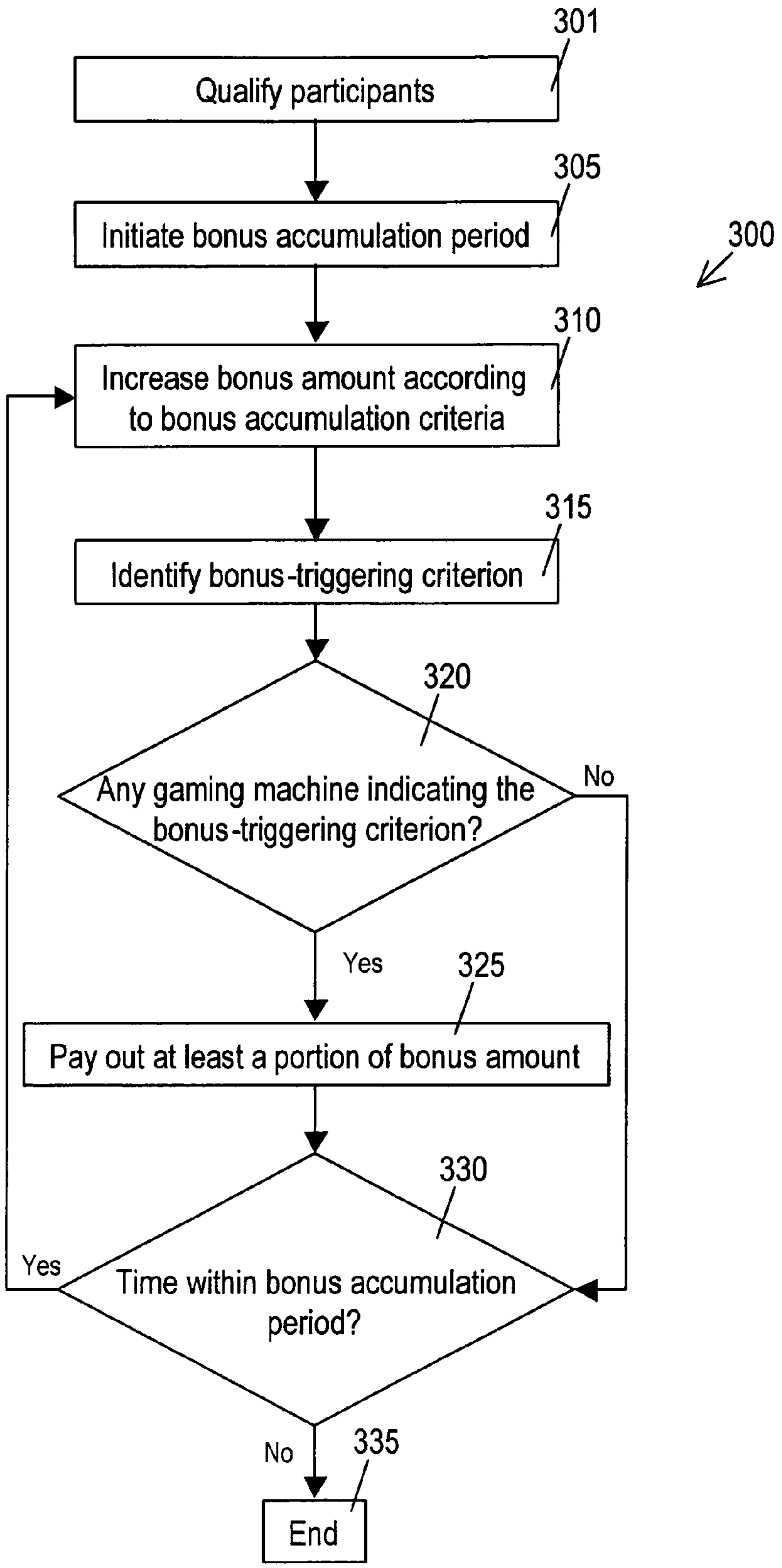
FIG. 3A is a flow chart that provides an overview of some wide area bonusing methods of the present invention.

FIG. 3A is a flow chart that illustrates bonusing method 300 according to some aspects of the invention. Bonusing method 300 is performed, at least in part, by one or more devices of central system 220 (e.g., by central bonusing server 270). The steps of method 300 need not be performed in precisely the sequence indicated in FIG. 3A. For example, the first step shown in FIG. 3A is step 301, in which gaming devices and/or casinos are qualified to participate in a bonusing round. However, step 301 is preferably a dynamic and ongoing process that continues during the time that the other steps of method 300 are being performed.

Qualification step 301 is preferably performed, at least in part, by central system 200 and/or a site controller. The qualification process may apply to individual gaming machines, to entire gaming establishments, to banks of gaming machines within a gaming establishment, to types of gaming machines, etc. Qualification criteria may include the type of game(s) available for play on the gaming machine, the size of wagers accepted by the gaming machine, the level of recent gaming activity at the gaming machine, the paytable percentage or payback percentage, the protocol used by the gaming machine, date range, location, device manufacturer, or other criteria.

As noted above, aspects of qualification step 301 may be shared between a site controller and a central controller. For example, the site controller could use a casino's desire to participate and the machines' rates of play to determine which gaming machines the site controller considers to be eligible. The site controller could forward that information to the central controller, which could apply its own criteria (e.g., manufacturer ID, denomination, paytable percentage, jackpot possibilities, etc.) to evaluate gaming machines for eligibility. The central controller preferably does not disclose the all of the conditions for eligibility, especially as they relate to paytable percentage, jackpot probabilities and manufacturer. Keeping these criteria confidential is advantageous because it eliminates the temptation to alter, legally or otherwise, disqualified gaming to skirt requirements that made them ineligible.

Qualification step 301 also involves disqualifying gaming machines, gaming establishments, etc., as conditions change. For example, the level of play at a gaming machine, bank of gaming machines, etc., may decrease below a predetermined threshold, thereby disqualifying one or more gaming machines. In some such implementations, the predetermined threshold is based upon a minimum total of wagers made during a predetermined period.

Step 301 (and other steps of method 300) may actually involve many separate steps. For example, in some implementations step 310 involves an ongoing process of polling the participating gaming establishments, gaming machines, banks of gaming machines, etc., to determine whether participating gaming machines should be qualified or disqualified, to evaluate additional gaming machines, etc.

In some such implementations, a device within each gaming establishment (such as the site controller) polls gaming machines and/or banks of gaming machines to evaluate the qualification status of gaming machines within that gaming establishment. In such implementations, a device within the central system (such as central bonusing server 270) needs only to poll the site controller of each gaming establishment instead of polling each individual gaming machine.

Figure 3B:
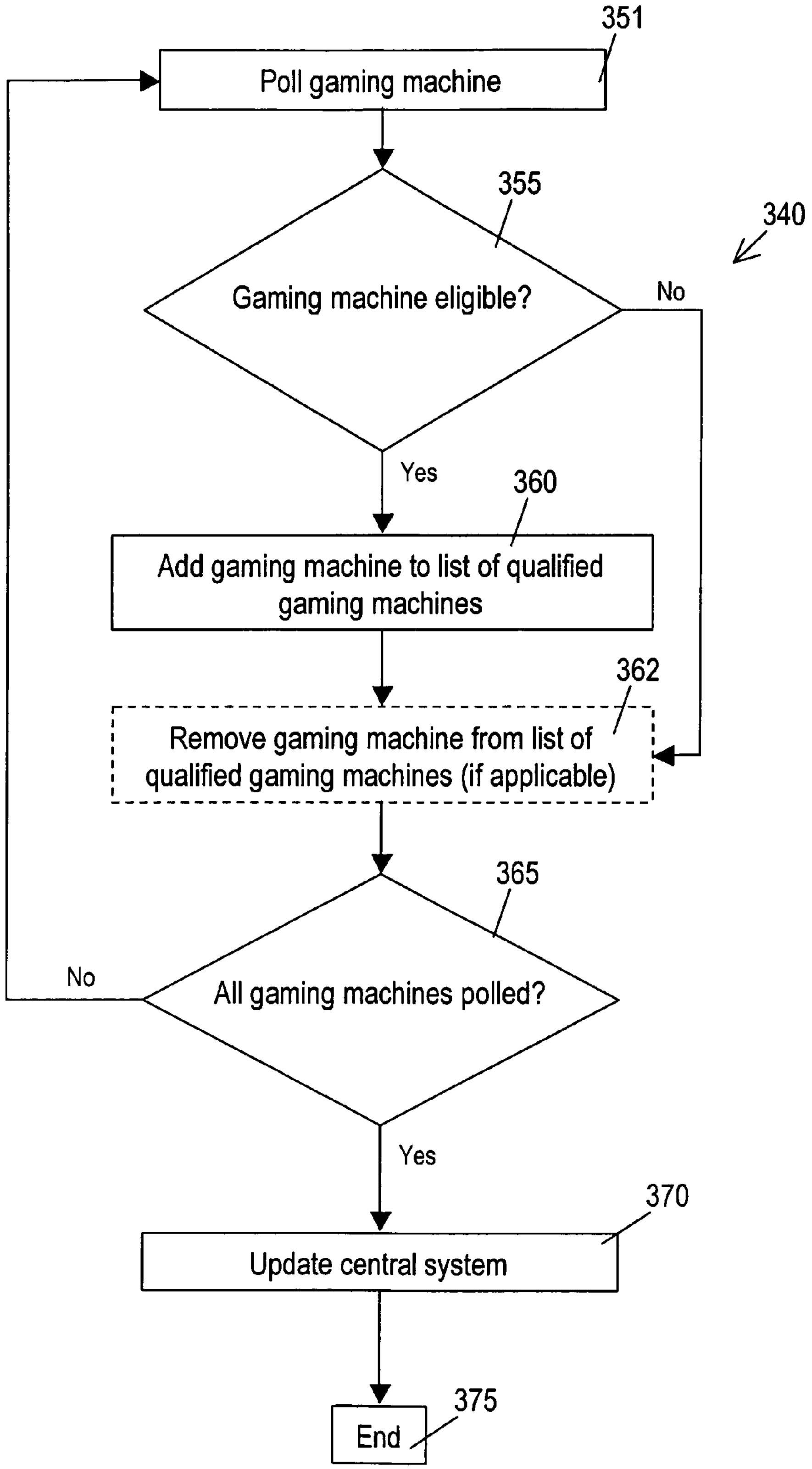
FIG. 3B is a flow chart that provides additional details of a wide area bonusing method according to the present invention.

One such implementation is depicted in the flow chart of FIG. 3B. According to method 340, the gaming devices of a particular establishment are polled at predetermined time intervals to determine whether they should be qualified or disqualified from participation in wide area bonusing. In step 351, a site controller polls a gaming machine at the same gaming establishment to obtain data upon which a qualification decision can be made. In step 355, the site controller determines whether, at that time, the gaming device is eligible. If so, the gaming machine is qualified and is added to a compilation (a table, a list, etc.), of qualified gaming machines (step 360). If the gaming device was previously qualified but is no longer eligible, the gaming machine is disqualified and is removed from the list of qualified gaming machines (step 362). If the gaming device was not previously qualified and is not eligible, the list remains unchanged. In some implementations, all gaming machines are indicated on the compilation at all times, instead of being added or removed. The status of each gaming device is revised, if necessary, during the polling process.

The site controller then determines whether all of the gaming machines have been polled during this time interval (step 365). If not, the polling process continues until all gaming machines are polled. If so, the central system is updated (step 370) and the process ends until the next time interval, during which a new polling cycle will be performed if the bonus round is still ongoing. It will be understood by those of skill in the art that other steps of method 300 (and other methods of the present invention) may be performed in a similar fashion, i.e., either solely by the central system or by both the central system and one or more devices in each gaming establishment.

Moreover, in some implementations of the invention, gaming machines send updates when certain activities occur, thereby eliminating some or all of the polling steps described herein. For example, some implementations provide an "interrupt-based" system, wherein gaming machines automatically send messages communicating their status. In such implementations, the gaming machines may send messages regarding their eligibility, e.g., update messages when a factor changes that may affect availability.

Still other implementations provide a system wherein a central controller or a site controller sends requests for eligibility data to networked gaming machines. In some such implementations, the controller sends requests for any eligibility data that have changed since a previous request and the gaming machines respond with the requested information, if any. Such requests may be sent at predetermined time intervals, upon the occurrence of a predetermined event, etc. In some such implementations, the gaming machines respond with a "no changes" message if no eligibility-related conditions have changed since the last poll.

In some implementations, master gaming controller 108 or another element of a gaming machine performs functions to provide, in part, the bonusing services of the present invention. U.S. patent application Ser. No. 09/642,192, filed on Aug. 18, 2000 and entitled, "Gaming Machine Virtual Player Tracking and Related Services," describes some relevant functions of a master gaming controller and is hereby incorporated by reference for all purposes.

During step 301, gaming machines that have been qualified or disqualified for a bonusing round are identified, e.g., by a game serial number. Identifying the gaming machines separately from the player (or without identifying the player) allows for bonuses to be awarded without reference to a player tracking system. As noted elsewhere in this disclosure, de-coupling player tracking features can facilitate the implementation of a wide area bonusing system, primarily because the wide area bonusing system will not require sharing of confidential player tracking information.

A bonus accumulation period begins in step 305. During this period a bonus will accrue, some or all of which may be awarded during a bonusing round. In some implementations, a fraction of each wager made on qualified and participating gaming machines is added to a bonus amount (step 310) during the bonus accumulation period. One or more devices of central system 220 (e.g., central bonusing server 270) keep track of the bonus amount. The criteria for increasing the bonus amount ("bonus accumulation criteria") may vary according to the particular implementation. For example, the fraction of each wager may increase or decrease, depending on the current size of the bonus amount. Alternatively, the fractional amount added to the bonus amount from each wager may be subject to a maximum or minimum. Any other convenient bonus accumulation criteria may be applied, subject to the laws of the appropriate jurisdiction(s).

Information regarding the bonus round may be displayed on or near participating gaming machines in order to generate interest in the bonus round and increase levels of play on the gaming machines. In some such implementations, a sign indicates one or more gaming machines that could participate in a bonusing round, but does not indicate the time or times that a bonus is available.

During the same time that a bonus amount is accruing (and possibly using the same hardware), a progressive jackpot may also be accruing. Some of the gaming machines that are qualified for, and participating in, the bonusing round may also be participating in a progressive jackpot round.

In step 315, at least one bonus-triggering criterion is determined. In order to win a progressive jackpot, a player must be entitled to some level of payout based on a predetermined outcome of the game being played. However, a bonus-triggering criterion does not require achieving a predetermined outcome based on gaming criteria. For example, a bonus-triggering criterion may be a number, preferably a random number, unrelated to a gaming criterion. The number may be generated by central system 220. Alternatively, the number may be made available to central system 220, e.g., by a person, by a random number generator at another location, etc.

In some implementations, there may be more than one bonus-triggering criterion. For example, two or more numbers may need to be matched in order for a bonus to be awarded. The numbers could originate from different sources in order to increase security. In such implementations, participating gaming machines would be instructed to generate the appropriate number of "guesses," as described below. The central system may provide an indication to participating gaming machines regarding a bonus-triggering criterion. For example, the central system may indicate that a winning number will fall within an indicated range of numbers.

In step 320, it is determined whether any gaming machine indicates the bonus-triggering criterion. In order to determine eligibility for receiving a bonus, gaming machines that are participating in a bonusing round may, for example, generate random numbers and transmit them to central system 220 for comparison with the number known by central system 220. In some implementations, a bonus may be awarded if the numbers match or if the numbers are within a certain range of one other. For example, if the number known by central system 220 were a 10-digit number, the least significant 2 digits may not need to match. In other words, if the number known by central system 220 were 1,234,567,890, any number from 1,234,567,800 through 1,234,567,899 could be a winning number in this example.

However, in some implementations, a matching number is a necessary condition but not a sufficient one: a bonus will be awarded only if other conditions also apply. For example, in some implementations a bonus will not be awarded unless at least a predetermined minimum bet was made at the time the numbers were found to match. The minimum amount may apply to an individual gaming machine, a group of gaming machines, an entire gaming establishment, etc. In other implementations, a bonus will only be awarded if a particular game is being played. If all conditions for awarding a bonus are satisfied, at least a portion of the bonus amount is paid out to a gaming machine (step 325).

The central controller (or site controller) preferably ignores random numbers (the "guesses") sent from ineligible gaming machines and/or does not send ineligible gaming machines a "bonus start" message that triggers the sending of such random numbers (or other forms of "guesses"). According to such implementations, it is not necessary for a gaming machine to know if it is eligible or not, thereby making attempts to gain an illegitimate eligibility status more difficult.

In some implementations, the central system may pay out bonuses until the available bonus pool/amount is depleted. In other implementations, bonuses will not be paid out unless the bonus pool is at or above a certain threshold. Some implementations make bonuses available in conjunction with the status of a progressive jackpot. For example, more bonuses may be awarded after a large progressive jackpot award in order to increase game play and accelerate the funding of a new progressive jackpot pool. In some implementations, indications that a bonus is available (e.g., a visual display, an audio announcement, etc.) will be triggered after a progressive jackpot is awarded. Some implementations set aside funds from progressive jackpots to fund bonuses and vice versa.

The scope of bonusing methods that may be applied may be limited by the laws of the applicable jurisdiction(s). For example, bonusing methods may be required to return a reasonable percentage of the money taken in, may need to be based (at least in part) on a random event, etc. Moreover, an audit trail may be legally required, for example of all money taken in and paid out at each gaming machine.

In step 330, it is determined whether the bonus round is still ongoing. If so, the bonus amount will continue to increase. If not, the method ends (step 335).

Figure 4:
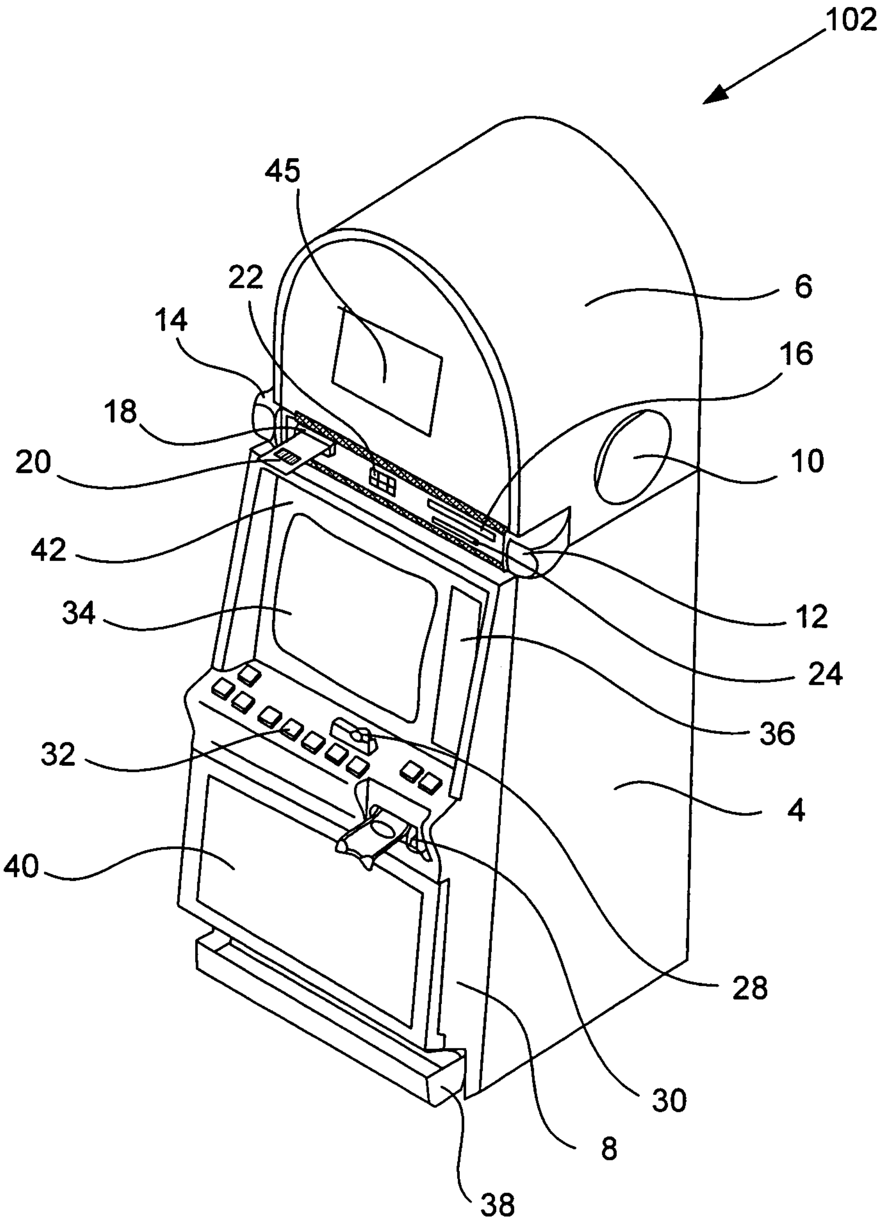
FIG. 4 illustrates a gaming device that may be used in accordance with various embodiments of the present invention.

Turning to FIG. 4, more details of gaming machine 102 are described. Machine 102 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the gaming machine 102. The devices are controlled by circuitry housed inside the main cabinet 4 of the machine 102.

The gaming machine 102 includes a top box 6, which sits on top of the main cabinet 4. The top box 6 houses a number of devices, which may be used to add features to a game being played on the gaming machine 102, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 to display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 102 is but one example from a wide range of gaming machine designs on which the present invention may be implemented. For example, not all suitable gaming machines have top boxes or player tracking features. Further, some gaming machines have two or more game displays—mechanical and/or video—and, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 4, when a user wishes to play the gaming machine 102, he or she inserts cash through the coin acceptor 28 or bill validator 30. In addition, the player may use a cashless instrument of some type to register credits on the gaming machine 102. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine.

During certain game functions and events, the gaming machine 102 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 102, from lights behind the belly glass 40 or the light panel on the player tracking unit 44.

After the player has completed a game, the player may receive award credits, game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 102. In some embodiments, these tickets may be used by a game player to obtain game services.

One related method of gaining and maintaining a game player's interest in game play involves player tracking programs that are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

Figure 5:
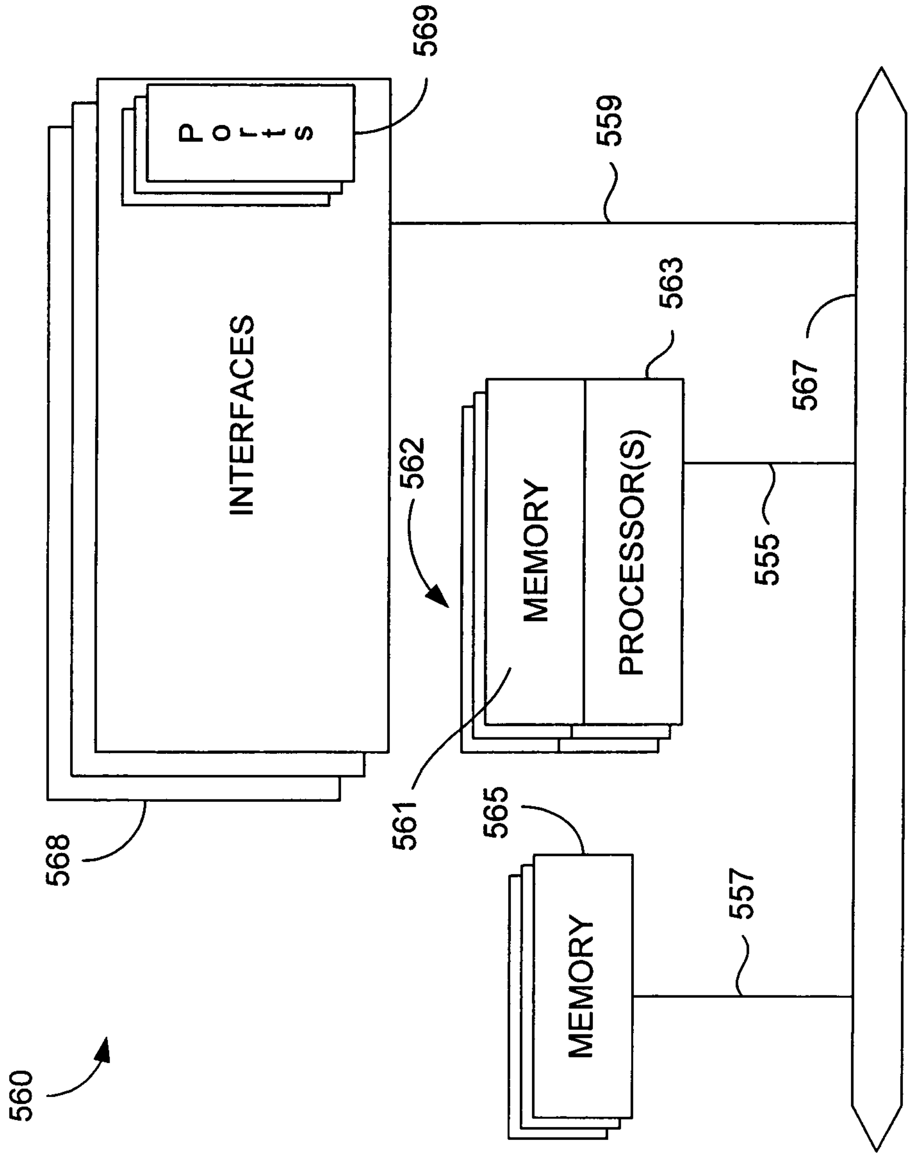
FIG. 5 is a block diagram of a network device that may be used to implement various embodiments of the present invention.

FIG. 5 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system and any appropriate applications software.

CPU 562 may include one or more processors 563 such as a processor from the Motorola family of microprocessors or the MIPS family of microprocessors. In an alternative embodiment, processor 563 is a specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device. The communication path between interfaces may be bus based (as shown in FIG. 5) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments. Additionally, the gaming network may be connected to other devices including other servers or gaming devices over the Internet or through other wired and wireless systems. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

We claim:

1. A method for providing wide-area bonusing on a gaming network, the method comprising:

initiating a bonus accumulation period;

determining, after the initiation of the bonus accumulation period, whether each gaming machine in a plurality of gaming machines on the gaming network is eligible to participate in the wide-area bonusing by polling each gaming machine in the plurality of gaming machines for metrics describing the gaming machine, wherein the metrics describing the gaming machine include at least one metric selected from the group including the type of games available for play on the gaming machine, the denominations the gaming machine is configured to accept, the paytable or payback percentage of the gaming machine, the protocol used by the gaming machine, the location of the gaming machine, and the gaming machine manufacturer, wherein the determining is based on the metrics describing each gaming machine, and wherein each gaming machine may be determined to be ineligible to participate in the wide-area bonusing even if previously determined to be eligible;

increasing a bonus amount from an initial bonus amount during the bonus accumulation period according to bonus accumulation criteria;

identifying a first bonus-triggering criterion for the increased bonus amount, wherein the identifying step comprises generating a first random number, the first random number separate from gaming criteria for games played on a plurality of gaming machines;

providing one or more random numbers on the plurality of gaming machines located in a plurality of gaming establishments and interconnected on a wide-area bonusing network;

determining whether one of the one or more random numbers generated on a particular gaming machine of the plurality of gaming machines meets the first bonus-triggering criterion by at least matching the first random number at least in part, wherein the particular gaming machine is eligible to participate in the wide-area bonusing per the determining step; and paying out at least a portion of the bonus amount to the particular gaming machine when the particular gaming machine meets the first bonus-triggering criterion.

2. The method of claim 1, wherein the method is performed without reference to a player tracking system.

3. The method of claim 1, wherein the bonus accumulation criteria include a percentage of a wager on a gaming machine.

4. The method of claim 1, further comprising qualifying a gaming establishment for participation in bonusing.

5. The method of claim 1, further comprising qualifying a portion of a gaming establishment for participation in bonusing.

6. The method of claim 1, wherein at least one step of the method is synchronized with an award of a progressive jackpot.

7. The method of claim 1, further comprising receiving a request for participation in bonusing.

8. The method of claim 1, wherein the identifying step is performed by a central system.

9. The method of claim 1, wherein the determining step is performed by a central system.

10. The method of claim 1, wherein the determining step is performed by a site controller of a gaming establishment.

11. The method of claim 1, wherein the determining step comprises comparing a random number generated by a gaming machine with a second random number.

12. The method of claim 1, further comprising the step of providing protocol mediation for different types of gaming machines.

13. The method of claim 1, wherein a first entity controls first gaming machines and a second entity controls second gaming machines of the plurality of gaming machines.

14. The method of claim 1, wherein a first entity controls a first gaming establishment and a second entity controls a second gaming establishment of the plurality of gaming establishments.

15. A method for providing wide-area bonusing on a gaming network, the method comprising:

initiating a bonus accumulation period;

determining, after the initiation of the bonus accumulation period, whether each gaming machine in a plurality of gaming machines on the gaming network is eligible to participate in the wide-area bonusing by polling each gaming machine in the plurality of gaming machines for metrics describing the gaming machine, wherein the metrics describing the gaming machine include at least one metric selected from the group including the type of games available for play on the gaming machine, the denominations the gaming machine is configured to accept, the paytable or payback percentage of the gaming machine, the protocol used by the gaming machine, the location of the gaming machine, and the gaming machine manufacturer, wherein the determining is based on the metrics describing each gaming machine, and wherein each gaming machine may be determined to be ineligible to participate in the wide-area bonusing even if previously determined to be eligible;

increasing a bonus amount from an initial bonus amount during the bonus accumulation period according to bonus accumulation criteria;

identifying a first bonus-triggering criterion for awarding the bonus amount increased during the bonus accumulation period wherein the identifying step comprises generating a first random number and identifying a second bonus-triggering criterion, the first random number separate from gaming criteria for games played on a plurality of gaming machines;

providing one or more random numbers on a plurality of gaming machines located in a plurality of gaming establishments and interconnected on a wide-area bonusing network;

determining whether one of the one or more random numbers generated on a particular gaming machine of the plurality of gaming machines meets the first bonus-triggering criterion by at least matching the first random number at least in part and wherein the determining step further comprises determining whether one of the plurality of gaming machines indicates the second bonus-triggering criterion, wherein the particular gaming machine is eligible to participate in the wide-area bonusing per the determining step; and paying out at least a portion of the bonus amount to the particular gaming machine when the particular gaming machine meets the first bonus-triggering criterion wherein the paying step further comprises paying out the at least the portion of the bonus amount to the particular gaming machine when the particular gaming machine further indicates the second bonus-triggering criterion.

16. The method of claim 1, wherein the identifying step comprises identifying a randomly generated number generated by a central system.

17. A network device for implementing a wide-area bonusing system, the network device comprising:

an interface for communicating with a plurality of site controllers via a network, each site controller of the plurality of site controllers configured for communication with gaming machines; and at least one logic device configured to:

initiate a bonus accumulation period;

determine, after the initiation of the bonus accumulation period, whether each gaming machine in a plurality of gaming machines on the gaming network is eligible to participate in the wide-area bonusing by polling each gaming machine in the plurality of gaming machines for metrics describing the gaming machine, wherein the metrics describing the gaming machine include at least one metric selected from the group including the type of games available for play on the gaming machine, the denominations the gaming machine is configured to accept, the paytable or payback percentage of the gaming machine, the protocol used by the gaming machine, the location of the gaming machine, and the gaming machine manufacturer, wherein each determination is based on the metrics describing each gaming machine, and wherein each gaming machine may be determined to be ineligible to participate in the wide-area bonusing even if previously determined to be eligible;

increase a bonus amount from an initial bonus amount during the bonus accumulation period according to bonus accumulation criteria;

identify a bonus-triggering criterion for the bonus amount, wherein the identifying step comprises generating a first random number, the first random number separate from gaming criteria for games played on a first plurality of gaming machines, the first plurality of gaming machines included in the plurality of gaming machines;

determine whether a first gaming machine of the first plurality of gaming machines meets the bonus-triggering criterion by matching the first random number at least in part with at least one or more random numbers provided by the first gaming machine, wherein the first gaming machine is eligible to participate in the wide-area bonusing per the determination for the first gaming machine;

pay out at least a portion of the bonus amount to the first gaming machine when the first gaming machine meets the bonus-triggering criterion;

initiate a progressive jackpot accumulation period;

increase a progressive jackpot from an initial jackpot amount during the progressive jackpot accumulation period according to progressive jackpot accumulation criteria;

identify a progressive jackpot triggering criterion based at least in part on gaming criteria for winning a game played on a gaming machine;

determine whether a second gaming machine of a second plurality of gaming machines indicates the progressive jackpot triggering criterion, wherein the second gaming machine of the second plurality of gaming machines is eligible to participate in the wide-area bonusing per the determining step, the second plurality of gaming machines included in the plurality of gaming machines; and pay out at least a portion of the progressive jackpot to the second gaming machine of the second plurality of gaming machines when the second gaming machine indicates the progressive jackpot triggering criterion.

18. The network device of claim 17, wherein at least one logic device is further configured to qualify gaming machines for participation in bonusing.

19. The network device of claim 17, wherein the first plurality of gaming machines and the second plurality of gaming machines are coextensive.

20. The network device of claim 17, wherein the first plurality of gaming machines and the second plurality of gaming machines are not coextensive.

21. The network device of claim 17, wherein the second plurality of gaming machines includes a first group of gaming machines located in a first gaming establishment and a second group of gaming machines located in a second gaming establishment.

22. The network device of claim 17, wherein at least one logic device is further configured to qualify gaming establishments for participation in bonusing.

* * * * *

UNITED STATES PATENT AND TRADEMARK OFFICE

CERTIFICATE OF CORRECTION

PATENT NO. : 8,419,542 B2
APPLICATION NO. : 10/923333
DATED : April 16, 2013
INVENTOR(S) : Ali Saffari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1381 days.

Signed and Sealed this
Seventh Day of October, 2014

Michelle K. Lee

Michelle K. Lee
*Deputy Director of the United States Patent and Trademark Office*